United States Patent
Fischer

(10) Patent No.: US 6,186,536 B1
(45) Date of Patent: Feb. 13, 2001

(54) INFLATABLE PROTECTIVE CUSHION TO COVER THE SIDE PANES OF A VEHICLE

(75) Inventor: Anton Fischer, Leinweiler (DE)

(73) Assignee: TRW Occupant Restraint Systems GmbH & Co. KG, Alfdorf (DE)

( * ) Notice: Under 35 U.S.C. 154(b), the term of this patent shall be extended for 0 days.

(21) Appl. No.: 09/283,092

(22) Filed: Mar. 31, 1999

(30) Foreign Application Priority Data

Apr. 3, 1998 (DE) ............................................. 298 06 200

(51) Int. Cl.⁷ ............................ B60R 21/16; B60R 21/22
(52) U.S. Cl. .................................. 280/730.2; 280/728.2; 280/749
(58) Field of Search ......................... 280/730.1, 730.2, 280/728.2, 749

(56) References Cited

U.S. PATENT DOCUMENTS

| | | | | |
|---|---|---|---|---|
| 5,660,414 | * | 8/1997 | Karlow et al. | 280/749 |
| 5,707,075 | * | 1/1998 | Kraft et al. | 280/730.2 |
| 5,788,270 | * | 8/1998 | Haland et al. | 280/729 |
| 5,924,722 | * | 7/1999 | Koide et al. | 280/730.2 |
| 5,924,723 | * | 7/1999 | Brantman et al. | 280/730.2 |

FOREIGN PATENT DOCUMENTS

| | | |
|---|---|---|
| 4337656 | 5/1995 | (DE) . |
| 197 26 782 | 1/1998 | (DE) . |
| 297 16 573 U | 3/1998 | (DE) . |
| 297 18 305 U | 3/1998 | (DE) . |
| 198 41 493 | 3/1999 | (DE) . |
| 2297950 | 8/1996 | (GB) . |
| WO9512504 | 5/1995 | (WO) . |
| WO9919174 | 4/1999 | (WO) . |

* cited by examiner

Primary Examiner—Lanna Mai
Assistant Examiner—Ruth Ilan
(74) Attorney, Agent, or Firm—Tarolli, Sundheim, Covell, Tummino & Szabo LLP

(57) ABSTRACT

An inflatable protective cushion to cover side panes of a vehicle in the event of a side impact has a front end and a front anchor point in an area of an A-column and a rear anchor point in an area of a C-column of the vehicle. The protective cushion further has a gas distribution tube substantially extending between the A and C-columns. The gas distribution tube is connected to a gas generator. The gas distribution tube has an end with a piston slidably accommodated therein. A piston rod is connected to said piston and protrudes from the end of the gas distribution tube. One of the anchor points is provided on a free end of the piston rod.

7 Claims, 2 Drawing Sheets

INFLATABLE PROTECTIVE CUSHION TO COVER THE SIDE PANES OF A VEHICLE

FIELD OF THE INVENTION

The invention relates to an inflatable protective cushion to cover the side panes of a vehicle in the event of a side impact, having a front end and a frontal anchor point in an area of the A-column and a rear anchor point in an area of the C-column of the vehicle, and having a gas distribution tube substantially extending between the A- and C-columns of the vehicle and connected to a gas generator.

BACKGROUND OF THE INVENTION

Such a protective cushion is stowed in the folded state along the lower roof edge within the vehicle. On account of the curved shape of the roof edge, the lower edge of the protective cushion must have a greater length than the straight connecting line between the two anchor points. When the protective cushion becomes activated, automatic shortening of its lower edge occurs due to the expansion of the protective cushion in transverse direction to the connecting line between the anchor points. In its activated state, the protective cushion is therefore stretched along its lower edge. However, after the gas pressure inside the protective cushion has decreased, the tension along its lower edge is lost. But in the event of the vehicle overturning, the protective action by the protective cushion is desired, by it acting as a protective curtain. The protective cushion cannot fulfill this function adequately when it is not under tension along its lower edge.

SUMMARY OF THE INVENTION

By the invention, a protective cushion of the type initially mentioned is further developed in the aspect that, on activation of the protective cushion, it is tensioned along its lower edge with the tension remaining effective even after the pressure in the protective cushion has decreased. According to the invention this is achieved in that the gas distribution tube has an end with a piston slidably accommodated therein, having a piston rod connected to the piston protruding from the end of the gas distribution tube, one of the anchor points being provided on a free end of the piston rod.

On activation of the protective cushion, the piston, and with it the piston rod, is pushed out of the front end of the gas distribution tube, causing the frontal anchor point of the protective cushion to be displaced towards the front. This means that the effective length of the line between the two anchor points is increased. The protective cushion is now tensioned along its lower edge between the two anchor points, independently of a shortening of the protective cushion which will occur when it becomes inflated. The tensioning of the protective cushion remains effective even after its relaxation.

According to a preferred embodiment, which is favored by the interior design of modern vehicles, the piston rod is inclined at an acute angle with respect to the straight line defined by the anchor points. With this embodiment there is no need for a separate back stop for both the piston and the piston rod, because the piston rod is clamped in the front end of the gas distribution tube, due to the traction exerted along the lower edge of the protective cushion.

BRIEF DESCRIPTION OF THE DRAWINGS

Further advantages and characteristics of the invention read from the following description of a preferred embodiment and the drawing referred to, in which.

DESCRIPTION OF PREFERRED EMBODIMENT

Figure 1:
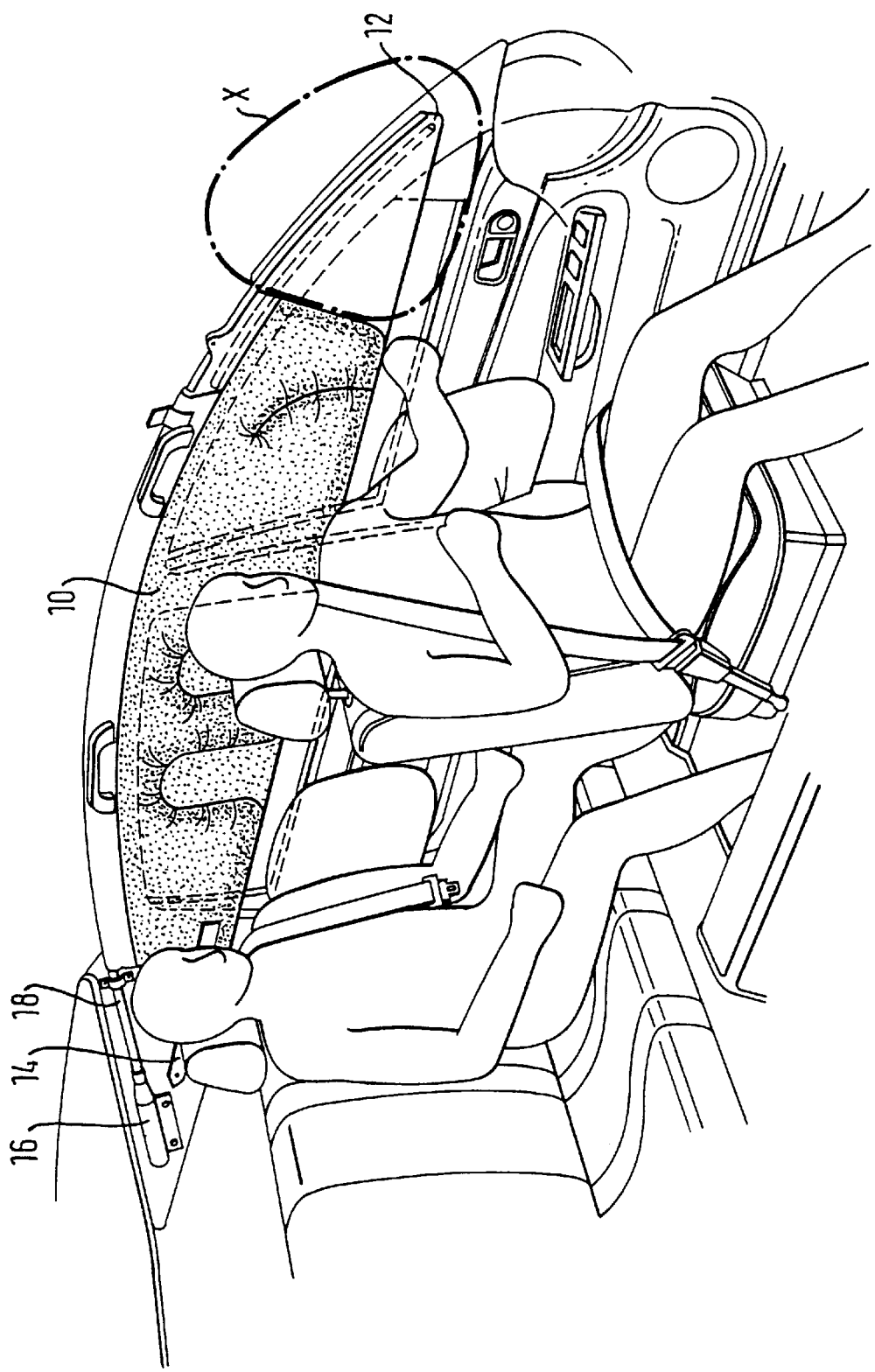
FIG. 1 shows a schematic general view of an activated protective cushion in a vehicle.

The protective cushion, generally given the designation 10 in the illustrations, is designed to cover the side pane of a vehicle in the event of a side impact or when the vehicle overturns, and extends from a frontal anchor point 12 at the A-column to a rear anchor point 14 at the C-column of the vehicle. A gas generator 16 is furthermore arranged at the C-column, from which a gas distribution tube 18 leads into the interior of the protective cushion 10. In its activated state, the protective cushion 10 forms a curtain which covers the side panes of the vehicle as well as the middle B column. As illustrated in FIG. 1, not the entire surface of the protective cushion is inflatable; the frontal end portion of the protective cushion, adjoining the anchor point 12, is not inflatable.

Figure 2:
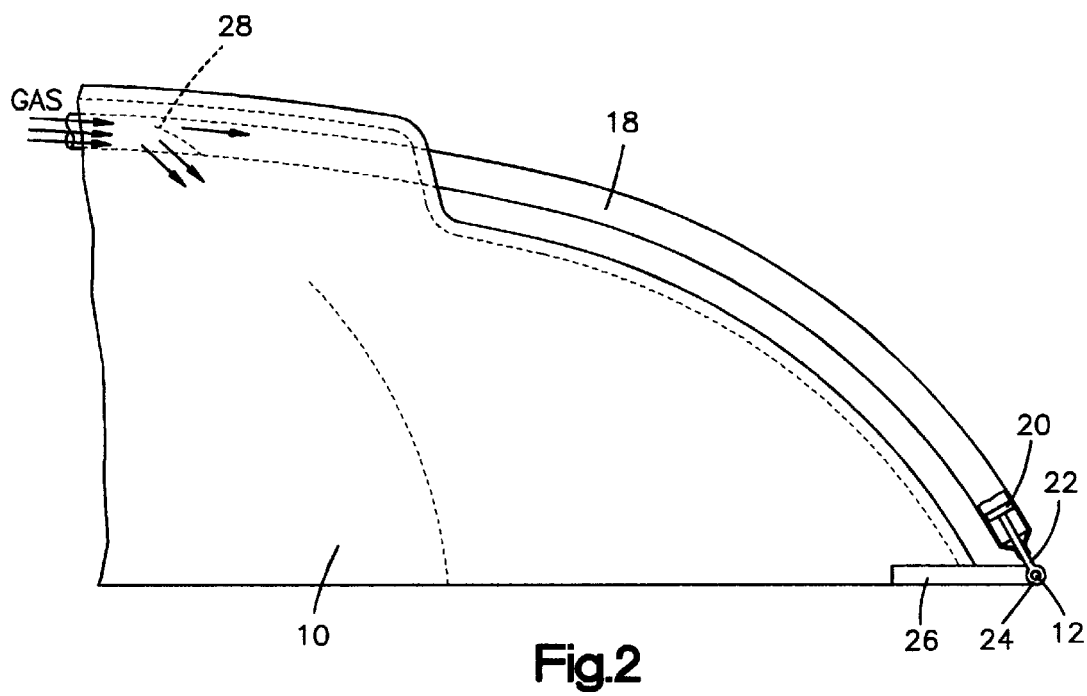
FIG. 2 shows an enlarged detail view of the area marked by a frame X in FIG. 1.
Figure 3:
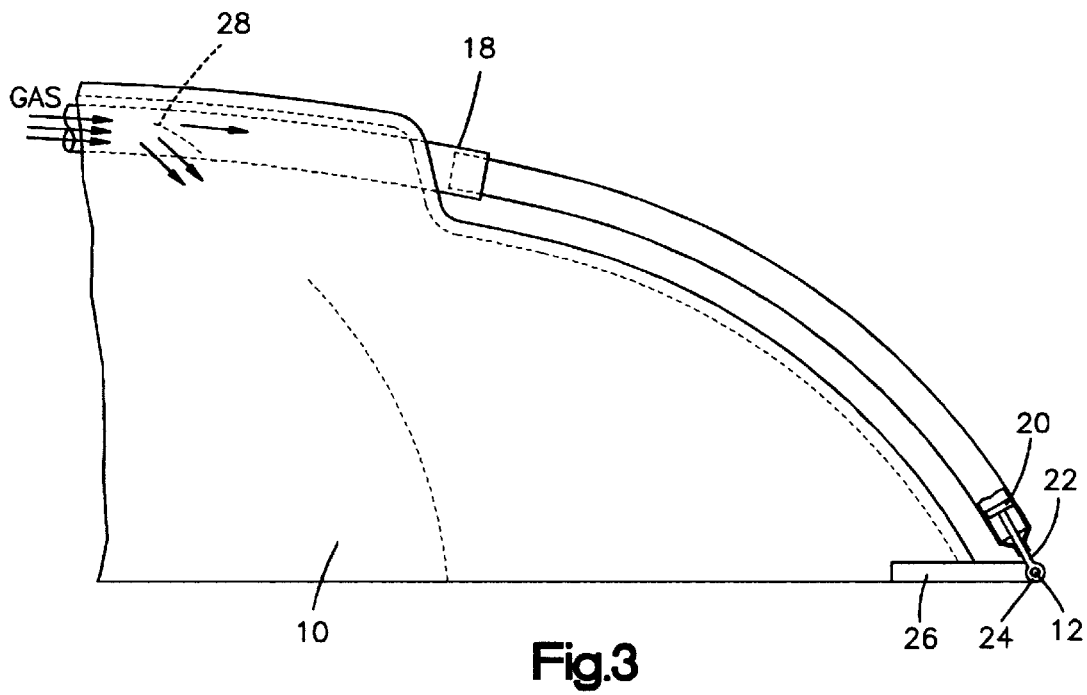
FIG. 3 shows an enlarged detail view of the area marked by a frame X in FIG. 1, according to an advantageous embodiment.

As illustrated in FIG. 2, the gas distribution tube 18 leaves the protective cushion 10 at its front end and is extended forward to the frontal anchor point 12. A slidable piston 20 is inserted into the front end of the gas distribution tube 18 and a piston rod 22, rigidly connected to the piston 20, protrudes from the end of the gas distribution tube 18. This end of the gas distribution tube 18 is flanged inwards and so forms a stop for the piston 20. The free end of the piston rod 22 is provided with an eye 24 which is connected to a tensioning strap 26, sewn on the front end of the protective cushion 10. The flow cross section of the gas distribution tube 18 is reduced by a gas deflection ramp 28 before it leaves the protective cushion 10. The diameter of the gas distribution tube 18 is also reduced at its front end. In its advantageous embodiment, as illustrated in FIG. 3, the gas distribution tube 18 is extended at its front end by an insert tube which is inserted into the gas distribution tube 18 and has a cross section with a lower diameter than that of the gas distribution tube 18.

For activating the protective cushion, the gas generator 16 is ignited. The compressed gases supplied by the gas generator 16 are fed into the inflatable part of the protective cushion 10 by way of the gas distribution tube 18. At the same time, the pressure produced acts upon the inner end face of the piston 20, whereby the piston with its piston rod 22 is pushed forwards until it meets the stop provided by the flanged end at the front end of the gas distribution tube 18. Together with the piston rod 22, the eye 24 is also displaced in a forward direction, whereby the distance between the anchor points 12, 14 is increased and the lower edge of the protective cushion 10 is correspondingly tensioned. Since the piston rod 22 is at an acute angle with respect to the straight line between the anchor points 12, 14, the piston 20 is clamped at the frontal end of the gas distribution tube 18 by the traction force produced so that a back stop becomes unnecessary.

What is claimed is:

1. An inflatable protective cushion to cover side panes of a vehicle in the event of a side impact, having a front end and a front anchor point in an area of an A-column and a rear anchor point in an area of a C-column of the vehicle, and having a gas distribution tube substantially extending between said A and C-columns and connected to a gas generator, said gas distribution tube having a portion located in said inflatable protective cushion and an end located outside said inflatable protective cushion, said end having a piston slidably accommodated therein, a piston rod connected to said piston protruding from said end of the gas distribution tube, one of said anchor points being provided on a free end of said piston rod.

2. The protective cushion according to claim 1, wherein said end of said gas distribution tube, from which said piston rod projects, is flanged inwards to form a stop for said piston.

3. The protective cushion according to claim 1, wherein an eye is formed at said free end of said piston rod.

4. An inflatable protective cushion to cover side panes of a vehicle in the event of a side impact, having a front end and a front anchor point in an area of an A-column and a rear anchor point in an area of a C-column of the vehicle, and having a gas distribution tube substantially extending between said A and C-columns and connected to a gas generator, said gas distribution tube having an end with a piston slidably accommodated therein, a piston rod connected to said piston protruding from said end of the gas distribution tube, one of said anchor points being provided on a free end of said piston rod, said piston rod being inclined at an acute angle with respect to a straight line defined between said anchor points.

5. An inflatable protective cushion to cover side panes of a vehicle in the event of a side impact, having a front end and a front anchor point in an area of an A-column and a rear anchor point in an area of a C-column of the vehicle, and having a gas distribution tube substantially extending between said A and C-columns and connected to a gas generator, said gas distribution tube having an end with a piston slidably accommodated therein, a piston rod connected to said piston protruding from said end of the gas distribution tube, one of said anchor points being provided on a free end of said piston rod, said gas distribution tube projecting at said front end of said protective cushion forward into said area of said A column.

6. An inflatable protective cushion to cover side panes of a vehicle in the event of a side impact, having a front end and a front anchor point in an area of an A-column and a rear anchor point in an area of a C-column of the vehicle, and having a gas distribution tube substantially extending between said A and C-columns and connected to a gas generator, said gas distribution tube having an end with a piston slidably accommodated therein, a piston rod connected to said piston protruding from said end of the gas distribution tube, one of said anchor points being provided on a free end of said piston rod, wherein a flow cross section of said gas distribution tube is reduced upstream of said piston.

7. An inflatable protective cushion to cover side panes of a vehicle in the event of a side impact, having a front end and a front anchor point in an area of an A-column and a rear anchor point in an area of a C-column of the vehicle, and having a gas distribution tube substantially extending between said A and C-columns and connected to a gas generator, said gas distribution tube having an end with a piston slidably accommodated therein, a piston rod connected to said piston protruding from said end of the gas distribution tube, one of said anchor points being provided on a free end of said piston rod, said protective cushion further comprising an insert tube that extends said gas distribution tube at said end of said gas distribution tube accommodating said piston, said insert tube having a cross section smaller than that of said gas distribution tube and being inserted in said gas distribution tube.

* * * * *